March 29, 1960 E. V. FLANDERS 2,930,371
GRINDING WHEEL DRESSING DEVICE
Filed Oct. 2, 1957 3 Sheets-Sheet 1

INVENTOR
*Ernest V. Flanders*
BY *Sughrue & Rothwell*
ATTORNEYS

March 29, 1960 E. V. FLANDERS 2,930,371
GRINDING WHEEL DRESSING DEVICE
Filed Oct. 2, 1957 3 Sheets-Sheet 2
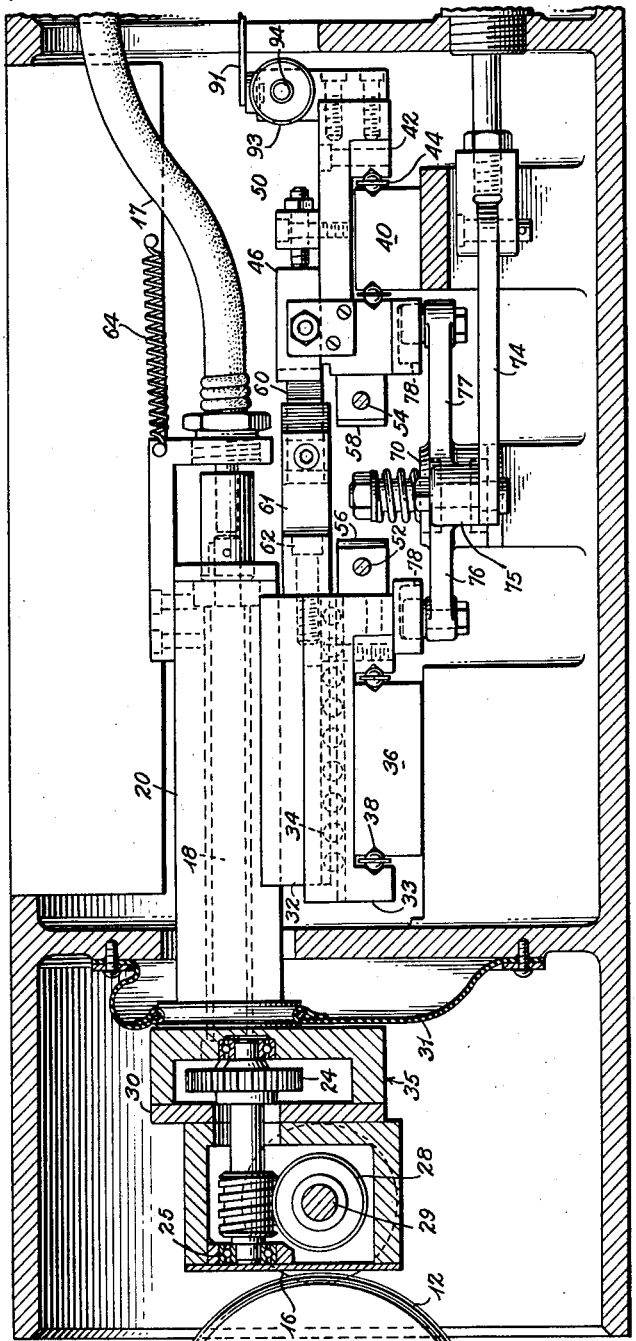
INVENTOR
*Ernest V. Flanders*
BY *Sughrue & Rothwell*
ATTORNEYS

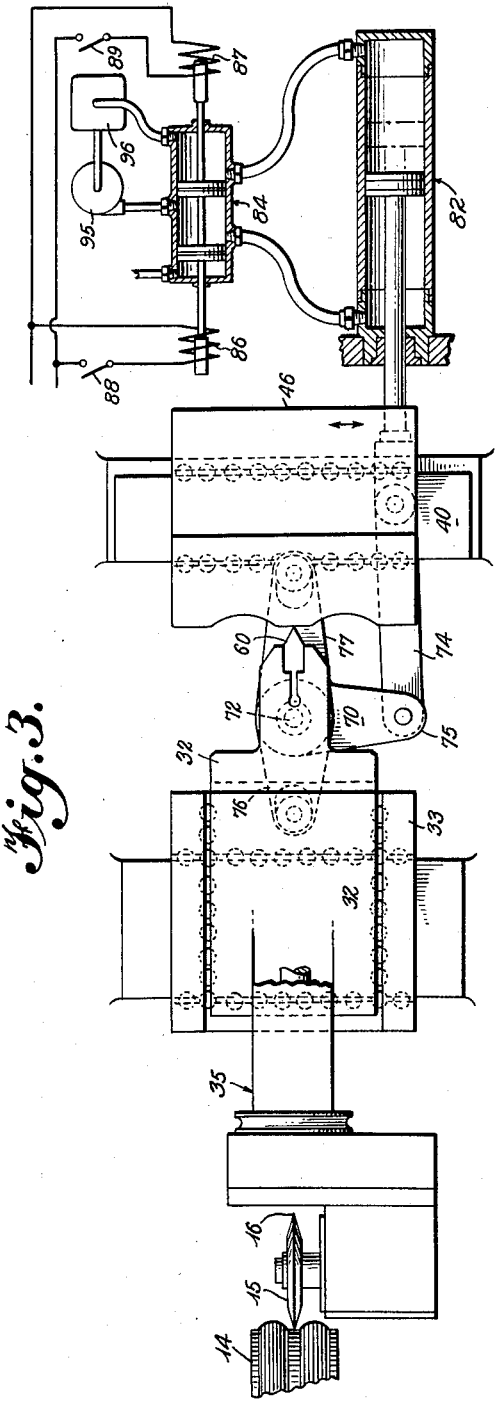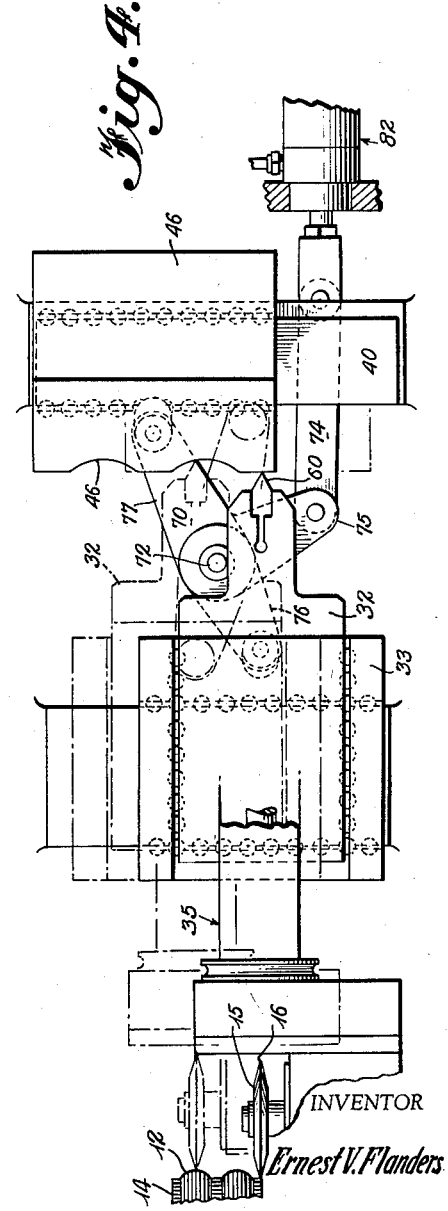

United States Patent Office 2,930,371
Patented Mar. 29, 1960

2,930,371
GRINDING WHEEL DRESSING DEVICE

Ernest V. Flanders, Springfield, Vt., assignor to Jones & Lamson Machine Company, a corporation of Vermont Application October 2, 1957, Serial No. 687,723

10 Claims. (Cl. 125—11)

This invention relates to a grinding wheel truing device for forming desired contours in the periphery of grinding wheels, and more particularly to a rotary truing device, having its translatory movement controlled by a template or pattern.

It is well known in the grinding wheel dressing art to form a desired contour in the periphery of a grinding wheel by means of a cam-controlled diamond point or similar device. For example, see Flander's Patent 2,292,874. While single-point cam-controlled dressing devices accomplish the desired results in some circumstances, they are subject to the disadvantage of the diamond point wearing, breaking, or spreading and the consequent loss of the desired contour. This invention overcomes this acute problem by substituting for the single-point truing device a rotary disc truing wheel of the cemented diamond-particle type. It is, of course, also well known to use a rotary dressing wheel; however, the rotary dressing wheels previously known are all moved in a straight line either across the periphery of the grinding wheel to form a straight periphery, or radially into the grinding wheel. The truing wheel or disc of this invention has a pointed periphery or the equivalent and is moved in accordance with a predetermined contour thereby generating a corresponding contour in the grinding wheel without the inherent disadvantages found in the single-point tools or the inflexibility of feeding a truing wheel straight across or into a grinding wheel.

By using an extremely hard truing disc; for example, a disc of the cemented diamond particle type such as made by Koebel Diamond Tool Company, formed with a ridge around the periphery thereof, or a pointed periphery, and moving this disc while rotating the same in response to a control cam or pattern, the desired periphery may be generated in a grinding wheel while the truing disc is rotating, with the tremendous advantage of not wearing down the pointed periphery of the truing device nearly as fast as the single point tool. This is because the cemented diamond particle type wheel has a plurality of small diamond particles set in a matrix which holds them securely. The exposed cutting edges of the diamond particles project an exact predetermined amount and act as a cutter, cutting an accurate shape in the grinding wheel. This type of wheel, of course, does not wear as fast as a single diamond having the same contour. The use of cemented diamond particle truing devices has been proposed, as shown for example by my prior Patent 2,778,170; however, in this patent the truing wheel has a periphery formed as a complement of the shape which it is desired to produce on a grinding wheel and is fed radially into the grinding wheel while being rotated. In this invention, a cemented diamond particle dresser disc, with a pointed ridge on its periphery, is simultaneously rotated and traversed across the periphery of the grinding wheel in response to a predetermined contour to generate a desired contour in the grinding wheel.

Another feature of the instant invention is the arrangement for transmitting the motion imparted by the cam to the work engaging periphery of the truing disc. In the usual template or pattern-controlled wheel truing setups, either the template or the follower stylus support is stationary and the other of these elements is moved relative thereto to impart a desired movement to the truing tool. The conventional arrangement has a disadvantage where it is desired to "stretch out" the contour of the controlling template. This stretch out is to accomplish a dimensional reduction between the template contour and the grinding wheel contour and this reduction may be in one direction only, e.g., the direction parallel with the rotative axis of the grinding wheel. According to a novel feature of this invention, both the controlling pattern or cam and the support for follower stylus are movable relative to each other simultaneously in opposite directions, thereby accomplishing a two-way stretch-out which utilizes considerably less space than that required for known controlling pattern mechanisms. In the particular cam-controlled arrangement of this invention, the cam contour is stretched out in a plane parallel with the rotative axis of the grinding wheel to a desired ratio while the depth extending radially into the wheel or transversely of the stretched out portion, is a one-to-one ratio. Since the follower stylus support and controlling template are moved simultaneously in opposite directions, the amount of the stretch-out in a line parallel to this movement is a function of the amount of movement of both these components.

Other objects and advantages will be apparent from the following description taken in connection with the accompanying drawings wherein:

Fig. 2 is a side elevation view partially in section.

Fig. 3 is a schematic plan view showing the means for moving the contour controlling elements.

Fig. 4 is a schematic plan view of a portion of the contour controlling elements of Fig. 3 showing their movement in another position.

Figure 1:
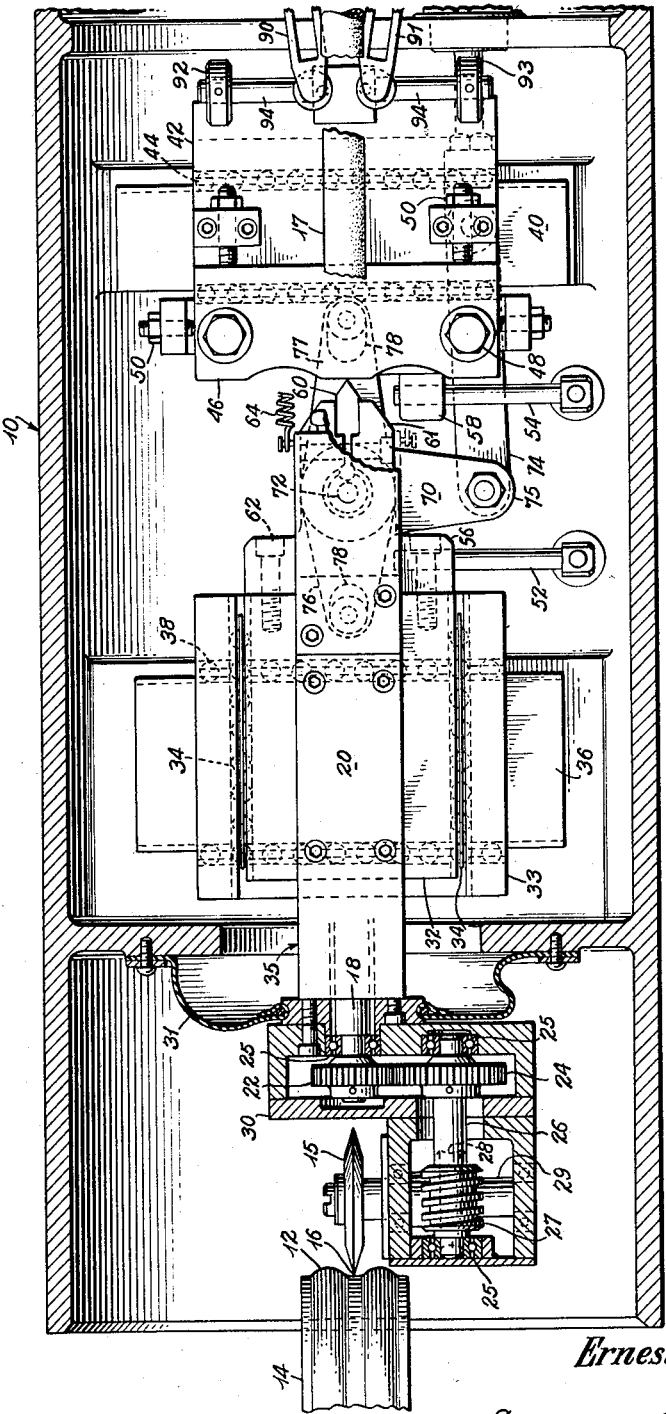
Fig. 1 is a plan view partially in section showing a preferred embodiment of the wheel truing device of this invention.

Briefly stated, this invention contemplates the use of a tool which may be in the form of a disc made preferably of a hard and abrasive substance like diamond particles held in a diamond matrix. This disc has a periphery which is pointed or ridged, and this ridge while being rotated or oscillated is traversed across the periphery of the grinding wheel is accordance with the contour of a controlling cam. Further, this invention discloses a novel controlling cam arrangement, saving considerable space by moving both the controlling cam and the cam follower support simultaneously in opposite directions.

Referring to the drawings, a preferred embodiment of the grinding wheel truing device of this invention is enclosed in a housing 10 and is adapted to contour the periphery 12 of a grinding wheel 14 by means of a rotary dressing disc 15 having a pointed periphery 16. This disc is composed of a plurality of small diamond particles bonded together in a suitable matrix. Therefore, as each point on the periphery of the disc comes in contact with the periphery of the grinding wheel it acts to cut away the periphery and thereby form it to any desired contour.

The truing or dressing disc is movably supported for movement in a plane transverse to the face of the disc through the disc axis, and the disc is also rotatably driven. The rotary drive of the dresser disc is from suitable drive motor, not shown, driving a flexible connection 17 and a drive shaft 18 within housing 20. A gear 22, attached to the end of this drive shaft, engages another gear 24 attached to a stub shaft 26. A worm 27 on the other end of this stub shaft engages a pinion 28 on the truing disc shaft 29. This drive train is rotatably supported by suitable bearings 25.

The gear train drive mentioned above is suitably enclosed within housing 30 and this housing is sealed from the main housing 10 by a flexible boot or bellows 31.

The assembly 35 supporting the rotary truing disc is mounted for universal movement in a single plane by means of a supporting carriage 32 rigidly attached to housing 20. This carriage is slidably mounted in one direction on a stylus cross slide 33 by means of bearings 34. This cross slide, in turn, is slidably mounted on a rigid support base 36 by bearings 38. As can be seen in Fig. 1, the cross slide and carriage are slidable at right angles to each other, thus compound movement within a single plane can be obtained for the truing disc supporting assembly 35.

A template slide support 40 is rigid with the housing 10 and slidably supports a template slide 42 on bearings 44 for movement parallel with the movement of the stylus slide. A template or control cam 46 is secured by suitable means 48 to the template slide. This template may be positioned by adjusting means such as screws 50 and is also removable for the insertion of various other templates having other control cams thereon.

A pair of guide rods 52, 54 are rigidly attached to the housing 10 and are parallel with each other and the slide supports. These guide rods extend through bushings 56 and 58 attached to the cross slide 33 and template slide 42. This arrangement assists in keeping the movement of the slides parallel to each other.

A stylus 60 is removably mounted on an extension member 61 attached to the carriage 32 by screws 62. Therefore, the motion of the stylus follower is transmitted directly to the truing disc. Suitable spring means 64 may be provided to bias the follower stylus 60 against the cam contour of the template.

A three-armed bell crank assembly is utilized to drive or move the template slide and the stylus cross slide simultaneously in opposite directions. This assembly comprises a three-armed bell crank 70 pivoted at 72 and having the ends of its three arms 75, 76 and 77 attached to the drive rod 74, the stylus slide 33 and the template slide 42, respectively. The connections with the stylus slide and template slide include elongated depressions 78 allowing the ends of the bell crank to travel in an arcuate pattern about the pivot 72 while moving the slides parallel to each other.

A reciprocating movement about pivot 72 is given to the bell crank 70 as the stylus 60 reaches a predetermined point on the template cam 46. This reciprocating drive is accomplished by a conventional fluid motor 82 of the piston and cylinder type (Fig. 3). The fluid motor is controlled by a conventional pilot valve 84 which, in turn, is actuated by a pair of solenoids 86 and 87. These solenoids are energized by suitable limit switches 88 and 89 and these limit switches are actuated by arms 90, 91 (Fig. 1) which are tripped by collars 92, 93 adjustably mounted on rods 94 attached to template slide 42. A suitable pump 95 and reservoir 96 arrangement is provided for supplying the hydraulic fluid to the actuating piston.

The operation of the device is as follows:

The grinding wheel 14 is rotated and simultaneously the dresser disc 15 with its pointed periphery 16 is rotated and is traversed across the periphery 12 of the grinding wheel in accordance with a predetermined contour on the template 46 to generate the desired contour on the grinding wheel. Since the dressing disc is the cemented diamond particle type as described above, the pointed periphery thereof acts as a rotating cutter while having the desirable qualities of a single diamond point with none of a single diamond's inherent disadvantages.

As space is at a premium, the template should be as small as possible within practical limits but also it is desirable the contour of the template be stretched out on a line parallel with the rotative axis of the truing disc or the grinding wheel. This stretch-out arrangement would normally call for a longer controlling cam as only the cam or the follower stylus is usually moved. However, the bell crank 70 moves both the stylus cross slide 33 and the control template 46 in opposite directions parallel to each other, therefore the stylus 60, as it is biased against the contour of the template, will follow this contour and transmit the same in any desired ratio to the truing disc. The movement of the stylus 60 and template 46 in opposite directions thereby accomplishes any desired ratio of stretch out or contour reduction while considerably reducing the space.

Describing the actual sequence of operations as shown in Figs. 3 and 4, in Fig. 3 the follower stylus 60 is in the center of the template cam 46 and the dresser disc 15 is in the center of the grinding wheel periphery 12, power piston is moving the arm 75 of the bell crank to the right as viewed in Fig. 3, thereby causing the other arms 76 and 77 of the bell crank 70 to move the stylus slide 33 and template slide 42 in opposite directions until they reach the position of Fig. 4. In this position, the movement of the template slide causes the collar 93 to trip the actuator arm 91 for the limit switch 89 and cause the pilot valve 84 to reverse the motion of the power piston, thereby causing the two slides to again reverse these previously described movements. The rotary dressing disc 15 is moved with its supporting assembly 35 and this assembly follows the movement of the stylus 60, therefore, the rotary truing disc follows this movement in a direction perpendicular to the rotary axis of the disc, and since the two slides 33 and 42 are moved in opposite directions the movement of the stylus slide in a direction parallel with the axis of the disc in the plane of movement is stretched out. That is, the curvatures formed in the controlling template are a proportional amount longer than the length of the curvatures formed on the grinding wheel. This stretch out can be any desired ratio, and in the example illustrated, the template moves 1½ times the movement of the cross slide, in an opposite direction, so the stretch out ratio is 2½ to 1.

I have disclosed a novel concept in grinding wheel dressing and the specific example shown and described was for the purpose of illustration only. Various modifications will be apparent to one skilled in the art and this invention is limited only by the spirit and scope of the appended claims wherein I am entitled to a reasonable range of equivalents.

I claim:

1. A grinding wheel truing device comprising in combination: a rotary dressing disc of the cemented diamond particle type, said disc having a continuous projection on the periphery thereof forming a work-engaging portion, means for rotating said dressing disc, means for supporting said rotating disc with its axis parallel to the axis of the grinding wheel being trued, and means for moving said supporting means and dressing disc in accordance with a predetermined contour such that the work-engaging periphery of the dressing disc contacts and cuts the periphery of the grinding wheel to generate a desired contour therein.

2. A device as defined in claim 1 wherein said last-recited means comprises: a template, and a follower stylus engaging said template, said stylus being mechanically linked to said disc supporting means for moving said dressing disc to generate a profile on said wheel which is proportional to the contour of said template.

3. A grinding wheel truing mechanism comprising: a truing tool, means mounting the truing tool for multi-directional movement in a single plane, said mounting means including at least one slide carrying a template follower, a template having a control contour, said template being movably supported for movement parallel to said slide, and means for moving the template and said slide of the mounting means simultaneously in opposite directions whereby the control contour of the template is reduced at the truing tool.

4. A grinding wheel truing mechanism comprising: a rigid support, a truing tool, a cross slide mounted for reciprocating movement along the rigid support, a support for the truing tool mounted for reciprocating movement in a single plane perpendicular to the movement of the cross slide, a contoured template, a follower stylus for engaging the contoured periphery of a template, means for supporting the contoured template for sliding movement on said rigid support parallel to the movement of the cross slide, and means for moving the follower stylus slide and template slide simultaneously in opposite directions.

5. A grinding wheel dressing mechanism comprising: a rotary disc dressing tool of the cemented diamond particle type having a continuous ridge grinding wheel contacting portion on the periphery thereof, means for rotatably mounting the dressing tool with its axis parallel to the axis of the grinding wheel being dressed, and means for traversing the rotating dressing tool across the working face of a grinding wheel in accordance with a predetermined contour of nonrectilinear nature.

6. A grinding wheel dressing mechanism for contouring the periphery of a grinding wheel comprising in combination: a control template, a rotary dressing tool capable of removing substantial material from a grinding wheel, said dressing tool having a projecting inverted V-shaped grinding wheel engaging portion on the periphery thereof, means for positively rotating the dressing tool, and means for supporting the rotary dressing tool with its axis parallel to the axis of the grinding wheel being dressed and means traversing the rotating dressing tool across the working face of the grinding wheel in accordance with the contour of the template for dressing the periphery of the grinding wheel in proportion to the contour of the template.

7. A device as defined in claim 6 wherein the template is mounted on a slidable member, a stylus is provided which is attached to the movable dressing tool support, the stylus being slidably mounted on a cross slide, the cross slide being also slidably mounted for motion parallel with the template slide, and means are provided for moving both of said slides simultaneously in opposite directions.

8. A device as defined in claim 7 wherein the last-recited means comprise: a hydraulic servomotor actuating a pivoted three-arm crank, the arms of the crank being connected to the servomotor, the template slide, and the stylus slide.

9. A grinding wheel truing device comprising in combination: a rotary truing disc constructed of a material capable of removing substantial stock from a grinding wheel, said disc having a pointed periphery for engaging the periphery of a grinding wheel to be contoured, means mounting said rotary truing disc for rotation on an axis parallel to the axis of a grinding wheel being trued, means for rotating said disc, and means for moving the pointed periphery of the disc across the periphery of a grinding wheel in accordance with a predetermined pattern of a curved nature.

10. A device for contouring and dressing the periphery of a grinding wheel comprising in combination: a rotary disc truing device of the cemented diamond particle type, said disc having a pointed periphery; means for rotatably driving said disc; a rigid support; a movable assembly for supporting said rotary disc; a cross slide, said assembly being slidably mounted on said cross slide, said cross slide being slidably mounted in a transverse direction on said rigid support; a follower stylus attached to said assembly; a controlling cam, said cam being slidably mounted on said rigid support in a direction parallel to the cross slide; spring means biasing said movable assembly to hold the follower stylus against the control cam; a three-arm pivoted bell crank having two arms thereof attached to said cross slide and slidable cam, a servomotor for actuating the third arm of the bell crank to move the cross slide and slidable cam in opposite directions, and limit means actuated by movement of the template for controlling the servomotor.

References Cited in the file of this patent
UNITED STATES PATENTS

| | | |
|---|---|---|
| 2,186,363 | Candee et al. | Jan. 9, 1940 |
| 2,482,785 | Lobutko | Sept. 27, 1949 |
| 2,803,095 | La Monica | Aug. 20, 1957 |